US009215585B2

(12) United States Patent
Pridmore et al.

(10) Patent No.: US 9,215,585 B2
(45) Date of Patent: Dec. 15, 2015

(54) ACQUIRING IDENTITY PARAMETERS BY EMULATING BASE STATIONS

(75) Inventors: Andrew Paul Pridmore, Hampshire (GB); Paul Maxwell Martin, Hampshire (GB); Riki Benjamin Dolby, Hampshire (GB)

(73) Assignee: Cobham TCS Limited, Waterlooville (GB)

( * ) Notice: Subject to any disclaimer, the term of this patent is extended or adjusted under 35 U.S.C. 154(b) by 2376 days.

(21) Appl. No.: 11/996,230

(22) PCT Filed: Jul. 17, 2006

(86) PCT No.: PCT/GB2006/002639
§ 371 (c)(1),
(2), (4) Date: Jan. 18, 2008

(87) PCT Pub. No.: WO2007/010223
PCT Pub. Date: Jan. 25, 2007

(65) Prior Publication Data
US 2008/0220749 A1    Sep. 11, 2008

(30) Foreign Application Priority Data

Jul. 22, 2005  (GB) .................................. 0515125.3
Jan. 31, 2006  (GB) .................................. 0601956.6

(51) Int. Cl.
*H04W 12/02* (2009.01)
*H04K 3/00* (2006.01)
(Continued)

(52) U.S. Cl.
CPC ................. *H04W 12/02* (2013.01); *H04K 3/65* (2013.01); *H04L 63/00* (2013.01); *H04L 63/123* (2013.01); *H04L 63/30* (2013.01); *H04W 12/06* (2013.01); *H04K 2203/16* (2013.01)

(58) Field of Classification Search
CPC ............ H04W 52/00; H04W 52/0238; H04W 52/241
USPC ....................... 455/414.1, 410, 411
See application file for complete search history.

(56) References Cited

U.S. PATENT DOCUMENTS 6,415,146 B1 *  7/2002  Capece .......................... 455/517

FOREIGN PATENT DOCUMENTS

EP          1051053 A2 * 11/2000
WO       2005011318 A1    2/2005

OTHER PUBLICATIONS

Cisco Systems, "Cisco Aironet 1100 Series Access Point Installation and Configuration Cuide", Cisco IOS Release Oct. 1, 2002, XP-002381713, pp. 8-1-8-5, 12-1-12-10, 13-1-13-12, 14-1-14-8.

(Continued)

*Primary Examiner* — Vladimir Magloire
*Assistant Examiner* — Sayed T Zewari
(74) *Attorney, Agent, or Firm* — Nixon Peabody LLP; Jeffrey L. Costellia

(57) ABSTRACT

A method of acquiring the identity parameters of two or more mobile devices (20), the method comprising: obtaining a list of two or more base stations (1, 2, 3); and acquiring identity parameters from the devices (20) by emulating each base station in the list. Two or more base stations may be simultaneously emulated, and the list of two or more base stations may be obtained by simultaneously interrogating two or more base stations (1, 2, 3). The identity parameters may be IMSI and/or IMEI and/or TMSI codes.

16 Claims, 4 Drawing Sheets

(51) Int. Cl.
*H04L 29/06* (2006.01)
*H04W 12/06* (2009.01)

(56) References Cited

OTHER PUBLICATIONS

Hannes Federrath, Security in Mobile Communications, Protection in GSM networks, mobility management and multilateral security, pp. 7, 80, 81 and 246—Braunschweig, Wiesbaden, Vieweg, 1999, ISBN 3-528-05695-9.

Fred Piper, et al., "Cryptographic Solutions for Voice Telephony and GSM", Network Security, presented at COMPSEC, 98, QELL Centre, Westminster, London, Dec. 1998.

International Search Report for PCT/GB2006/002639 Dated Sep. 25, 2006.

* cited by examiner

ACQUIRING IDENTITY PARAMETERS BY EMULATING BASE STATIONS

The present invention is concerned with a method and associated apparatus for acquiring identity parameters from two or more mobile devices.

An IMSI Catcher is described in Hannes Federrath, Security in Mobile Communications: Protection in GSM networks, mobility management and multilateral security—Braunschweig; Wiesbaden: Vieweg, 1999, ISBN 3-528-05695-9. The IMSI Catcher behaves like a BTS and like an MS in relation to the "genuine" BTS of the network carrier. The IMSI Catcher transmits a signal on the BCH, which must be received more strongly by the MSs than the signal of the genuine BTS. The MSs continuously select the BTS that can be optimally reached and consequently they answer to the IMSI Catcher.

A method for identifying the user of a mobile telephone and for listening in to outgoing calls is described in EP A 1051053. A Virtual Base Station (VBTS) obtains a Broadcast Allocation (BA) list of base stations, selects a base station from the BA list, and emulates the base station in order to acquire identity parameters (IMSI, IMEI) from the mobile telephone. EP A 1051053 is concerned with obtaining the IMSI and IMEI of a single target device, in order to intercept the calls of the user.

The present invention provides a method and apparatus for acquiring the identity parameters of two or more mobile devices, the method comprising:
  a) obtaining a list of two or more base stations; and
  b) acquiring identity parameters from the devices by emulating each base station in the list.

In contrast with EP A 1051053, which acquires identity parameters associated with a single mobile device by emulating a single base station, the present invention acquires a list of identity parameters associated with two or more mobile devices by emulating two or more base stations. This list can then be used for a variety of different purposes. For instance, the list can be compared with subsequent lists to track the movements of a particular subscriber and/or device.

The base stations may be for example GSM Base Station Transceivers (BTSs) or Third Generation (3G) NodeBs.

Embodiments of the present invention will now be described with reference to the accompanying drawings, in which.

Figure 1:
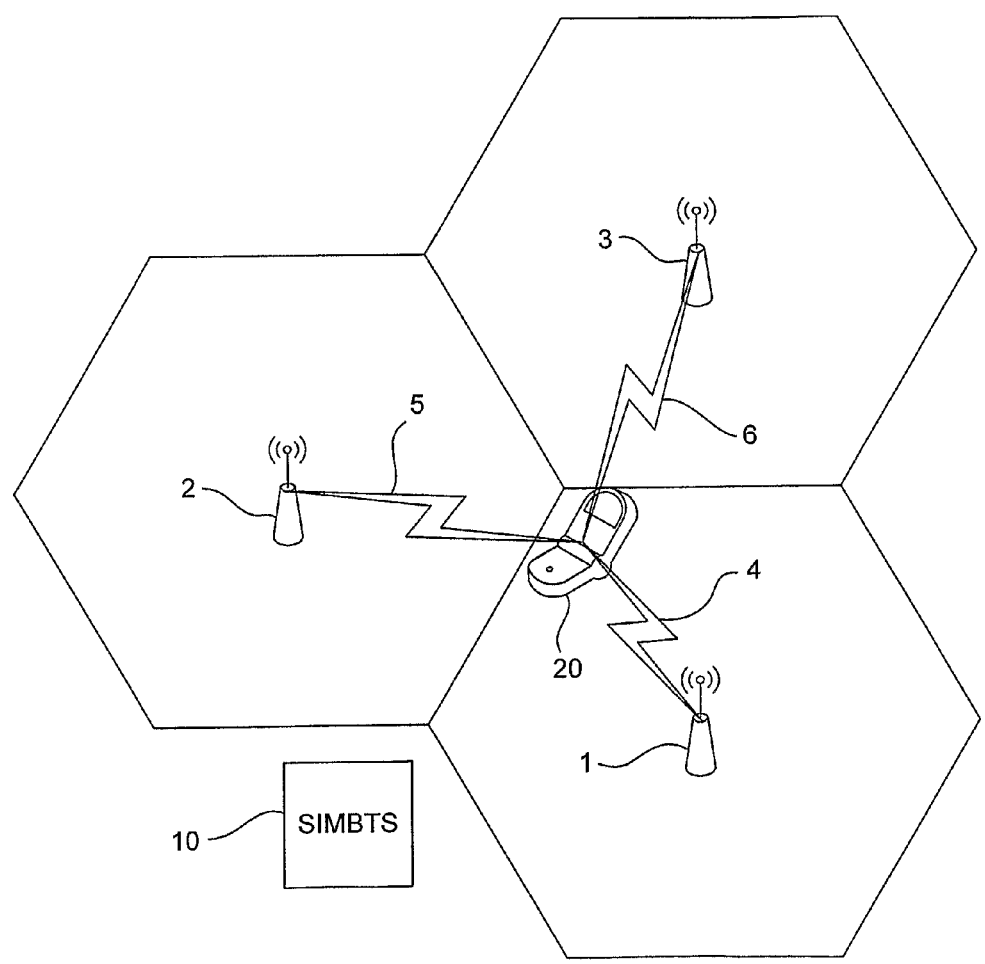
FIG. 1 is a schematic diagram showing a GSM network including a mobile station (MS) receiving multiple Broadcast Channels (BCH), and a SIMBTS.

Conventional GSM mobiles phones (MSs) use two algorithms known as the C1 and C2 algorithms to decide on which base station (BTS) to camp. Camp is here defined as the Base Transceiver Station (BTS) which is transmitting broadcast information to which the mobile is listening. This situation is illustrated in FIG. 1 where three BTSs 1-3 are broadcasting on three unique BTS Broadcast Channels (BCH) 4-6. On moving into the vicinity of the three BTSs, a Mobile Station (MS) 20 evaluates on which BTS to camp. Once the camping decision is made, the mobile moves to receive the BCH from the chosen BTS as per the GSM specifications.

The mobile 20 may choose to actively register with the network through the chosen BTS if a Location Area boundary is crossed or if a network defined time has elapsed. The mobile 20 receives a list (the Broadcast Allocation or BA list) of neighbouring BTS broadcast frequencies from the camped BTS and is mandated to scan these broadcast channels for signal parameters. As a mobile moves, it calculates the C1 and C2 parameters based on the received signal strengths of the current BTS and the neighbouring BTSs contained in the BA list. If a hysteresis threshold is crossed, then the mobile will camp onto the new BTS with higher signal strength and/or signal quality (note this simplifies the actual process involved).

Taking the case of a single Location Area within an area of good GSM coverage; this Location Area will be served by several BTSs. Now considering a particular mobile phone; this will be camped on one of the BTSs serving the target area. The actual BTS on which the mobile is camped will depend on three parameters:
  a) The received signal strengths (in the standards, RLA_C) of the serving BTSs at the location of the mobile phone.
  b) The setting of the BCH parameters used by the C1 and C2 algorithms, including:
     RXLEV_ACCESS_MIN
     MS_TXPWR_MAX_CCH
     CELL_RESELECT_OFFSET (CRO)
     TEMPORARY OFFSET
     PENALTY_TIME
     CELL_RESELECT_HYSTERESIS (CRH)
  c) The history of the location of the mobile phone, for example if the phone was camped on BTS 1 and has moved to a location where the signal strength from BTS 2 is greater (but less than CRH) then the phone will remain camped on BTS 1.

Due to point c), mobile phones present in a particular region of interest will be camped on many and perhaps all of the BTSs serving the region. Note also that there is a further complication which is that the BTSs serving a particular location will have differing BA lists. The consequence of this is that the mobile phones in a particular location will potentially be scanning different sets of broadcast frequencies. Although the BA lists are likely to overlap substantially, there will be differences.

Figure 2:
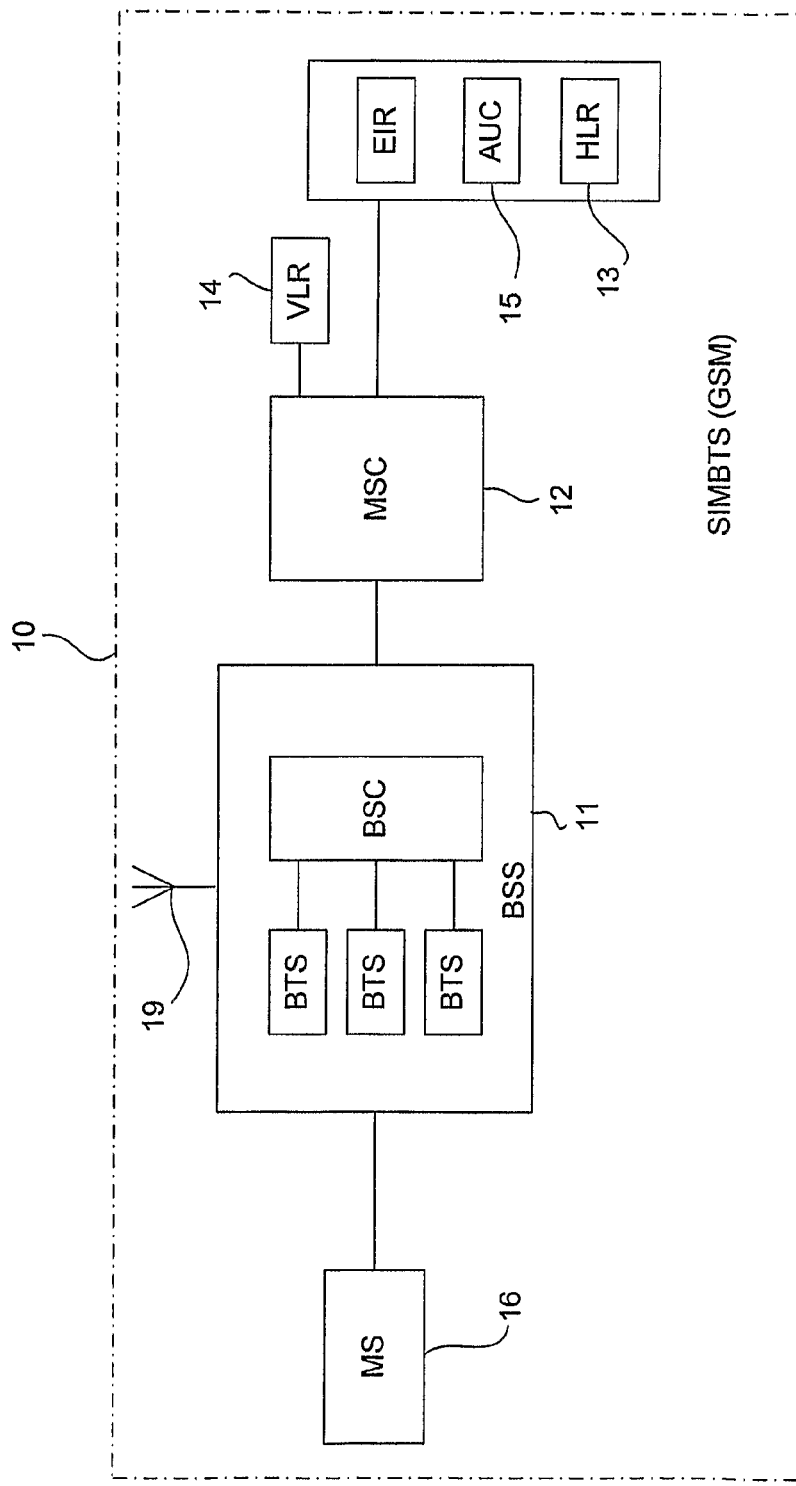
FIG. 2 shows the SIMBTS in further detail.

A Separately Introduced Multiple Base Station (SIMBTS) 10 is shown in FIG. 1, and in detail in FIG. 2. The SIMBTS is configured to acquire identity parameters from a set of Mobile Stations (MSs) registered with the GSM network shown in FIG. 1. The principle aim of the SIMBTS is to interrogate all MSs in a particular area in order to acquire their International Mobile Subscriber Identity (IMSI), International Mobile Equipment Identity (IMEI) and Temporary Mobile Subscriber Identity (TMSI) identities.

The SIMBTS 10 is typically a mobile device, which may be housed in a vehicle. In use, the SIMBTS 10 is moved to an area, and operated to acquire identity parameters from a set of MSs registered with the GSM network in that area. Alternatively the SIMBTS 10 may be permanently located in an area of interest. In both cases, the SIMBTS 10 effectively transmits a false cell broadcast which is not under the control of the GSM network providing coverage to that area.

The SIMBTS 10 performs a subset of the functions of a complete GSM network, ranging from air interface protocol exchanges in the Base Station System (BSS) 11 to the switch oriented functions at the Mobile Switching Centre (MSC) 12 and security and authentication functions of the Home Location Register (HLR) 13, Visitor Location Register (VLR) 14 and Authentication Centre (AUC) 15.

Key to the practical application of the SIMBTS 10 is the speed of acquisition of the data. This enables the SIMBTS operator to spend the minimum amount of time in a particular area, speeding up operation and minimising the personal risk to the operator.

The SIMBTS 10 bypasses conventional GSM procedures to achieve the objective of obtaining all mobile identities from phones served by a particular operator. To do this, the following steps are performed:

1. The SIMBTS 10 forces a test MS 16 (eg Ericsson TEMS) to obtain broadcast allocation lists (BA lists) from all BTSs serving a particular location and for all operators. The procedure is to:

a) go to the BTS with the highest signal strength (BTS 1);

b) obtain its BA list and parameters controlling the C1 and C2 algorithms;

c) force the test mobile 16 to go to the first BTS in the BA list (BTS2) and obtain its BA list;

d) continue until BA lists from a certain number of BTSs are obtained or, alternatively and in an enhanced algorithm, all BTSs with signal strengths within CRH dB of BTS1 are obtained.

2. Compute the list of common BTSs (union) from all received BA lists passing the criterion mentioned in 1d) above (these constitute the complete set on which all mobiles in the area around the test mobile 16 are going to be camped from all network operators).

3. Emulate all BTSs in the common BTS (BA) list and obtain the mobile identities. Note that there are two possible methods to emulate BTSs: a) one at a time, and advantageously via an autonomous autorotation process; or, b) a considerable enhancement over a) is to emulate several BTSs simultaneously. The key advantage is the decreased time required to gain the IMSIs and IMEIs due to the parallel operation. This depends on the capabilities of the hardware and management software which must be carefully designed to avoid interference issues.

Note that to convey its identities, the mobile must perform a "location update". The mechanism for this is for a BTS in the current BA list received by the mobile, to be of higher than CRH signal strength than the current BTS. The mobile will then camp on the new BTS and, if the location area code (LAC) is different, it will perform a location update, thereby triggering an identity exchange.

The important point here is that the emulation of BTSs and acquisition of mobile identities can be automated. No operator interaction is required other than to start the process. Consequently the process can be high speed. Typically the location of the operators of this equipment is "difficult" and the key driver is to minimise the time to complete the operation.

The process in point 3.a) above is illustrated in the table of operation given in Table 1.

TABLE 1

Sequential Process for SIMBTS MS identity acquisition

| Step | Action | Result |
|---|---|---|
| 1 | Use test phone 16 to perform steps 1 and 2 above to obtain list of BTSs with signal strength > CRH from Operator A, Operator B, Operator C etc for all local network operators. Alternatively a predetermined maximum number of BTSs (for instance four) may be selected for each operator. | List of BTSs Operator A: A1 . . . A6 Operator B: B1 . . . B4 Operator C: C1 . . . C3 (for example) |
| 2 | For Operator A, choose BCH information from BTS A1 and use this to configure SIMBTS | SIMBTS emulates BTS A1 |
| 3 | Receive Location Updates from Operator A MSs | Produce list of identities |
| 4 | After either a) a preset time [t] or b) rate of MS Location Updates decreases to [n] LU per minute choose BCH information from BTS A2 and use this to configure SIMBTS | Completion of emulation of BTS and start emulation of new BTS |
| 5 | Repeat steps 3 and 4 until all Operator A BTSs in list have been emulated | Operator A emulation complete |
| 6 | Now switch to new operator (eg Operator B) and repeat steps 2 to 5 for Operator B, C . . . BTSs | All BTSs from all Operators have been emulated in area |

Thus, in summary the following sequence of steps is performed:

1. Obtain list of BTSs for Operator A
2. Obtain list of BTSs for Operator B
3. Obtain list of BTSs for Operator C
4. Emulate all BTSs in A list
5. Emulate all BTSs in B list
6. Emulate all BTSs in C list Note that step 1 in Table 1 obtains BA lists from one BTS at a time. An enhanced technique for simultaneously obtaining BA lists from several BTSs takes step 1 in Table 1 and implements it simultaneously for several BTSs. These BTSs can be allocated as follows:

1 BA lists may be obtained by simultaneously interrogating Multiple BTSs for one Operator; or 2 BA lists may be obtained by simultaneously interrogating Multiple Operators; or 3 BA lists may be obtained by simultaneously interrogating Multiple Operators and Multiple BTSs per Operator.

Note that steps 2 to 5 in Table 1 are implemented for one BTS at a time. An enhanced technique for simultaneously emulating several BTSs takes steps 2 to 5 in Table 1 and implements them simultaneously for several BTSs. These BTSs can be allocated as follows:

1 Multiple BTSs for one Operator are simultaneously emulated; or

2 Multiple Operators are simultaneously emulated; or

3 Multiple Operators and Multiple BTSs per Operator are simultaneously emulated.

Simultaneous acquisition of BA lists, and simultaneous emulation require the SIMBTS to employ a multiband antenna 19 connected to multiband transmitter/receiver circuitry which can communicate simultaneously on multiple frequencies.

The allocation of BTSs to be emulated has to take into account conventional frequency planning considerations. This then governs how close the ARFCN spacing can be for simultaneous BTSs.

The advantage of simultaneous multiple emulation is that the identities of the local population of MSs can be acquired more quickly than with serial emulation. The factor of speed improvement is proportional to the number of BTSs emulated. Thus simultaneous emulation of four Operators will result in a factor of four speed improvement, all other conditions being equal.

An enhanced version of the process described above is to conditionally retain or reject mobiles as they register to the SIMBTS. The importance of this is that quickly rejecting mobiles, which are of no interest to the SIMBTS operator, back to their normal network operator minimises the impact for those mobiles. The SIMBTS is therefore of enhanced covertness due to the use of this technique. Specifically the MS user is very unlikely to notice that their phone is temporarily (for a few seconds) registering to the SIMBTS.

The detailed procedure is as follows:

TABLE 2

Detailed MS Accept or Reject

| Step | Action | Result |
|---|---|---|
| 1 | SIMBTS is set up to cause mobiles to be attracted | |
| 2 | Mobile discovers SIMBTS | |
| 3 | MS evaluates C1/C2 and decides to perform Location Update | |
| 4 | Mobile performs Location Update | |
| 5 | Mobile submits [Location Update Request] message | |
| 6 | SIMBTS issues three identity challenges for IMSI, IMEI and TMSI | |
| 7 | SIMBTS receives three identities | |
| 8 | SIMBTS decides whether to accept or reject location update. Decision is dependent on whether any of the three identities is a target | |
| 9 | SIMBTS issues Location Update Accept or Reject dependent on step 8 | Mobile receives either LU-accept in which case it camps on SIMBTS or LU-reject in which case a standard GSM rejection message (such as "roaming not allowed in this location area") is sent to the MS which returns back to its home network. |

The output of the method described above is a first set of identity parameters (that is, a set of IMSIs, IMEIs and TMSIs) associated with a first region A(1) and a first time T(1). Let this set be designated as L(1). In a subsequent step performed at time T(2), a second set of identity parameters L(2) may be obtained for the same region A(1), or for a different region A(2). Further sets L(3) ... L(n) may then be obtained at times T(3) ... T(n) for the same region A(1), or for respective different regions A(3) ... A(n). The sets (L(1), L(2) ... L(n)) can then be analyzed to identify one or more identity parameters which are contained in each set (L(1), L(2) ... L(n)). This can then be used to track the movement of a particular device (or subscriber) between the different regions A(1), A(2) ... A(n), at different times T(1), T(2) ... T(n), or to demonstrate the presence of a device (or subscriber) for the same region A(1) at different times T(1), T(2) ... T(n).

Figure 3:
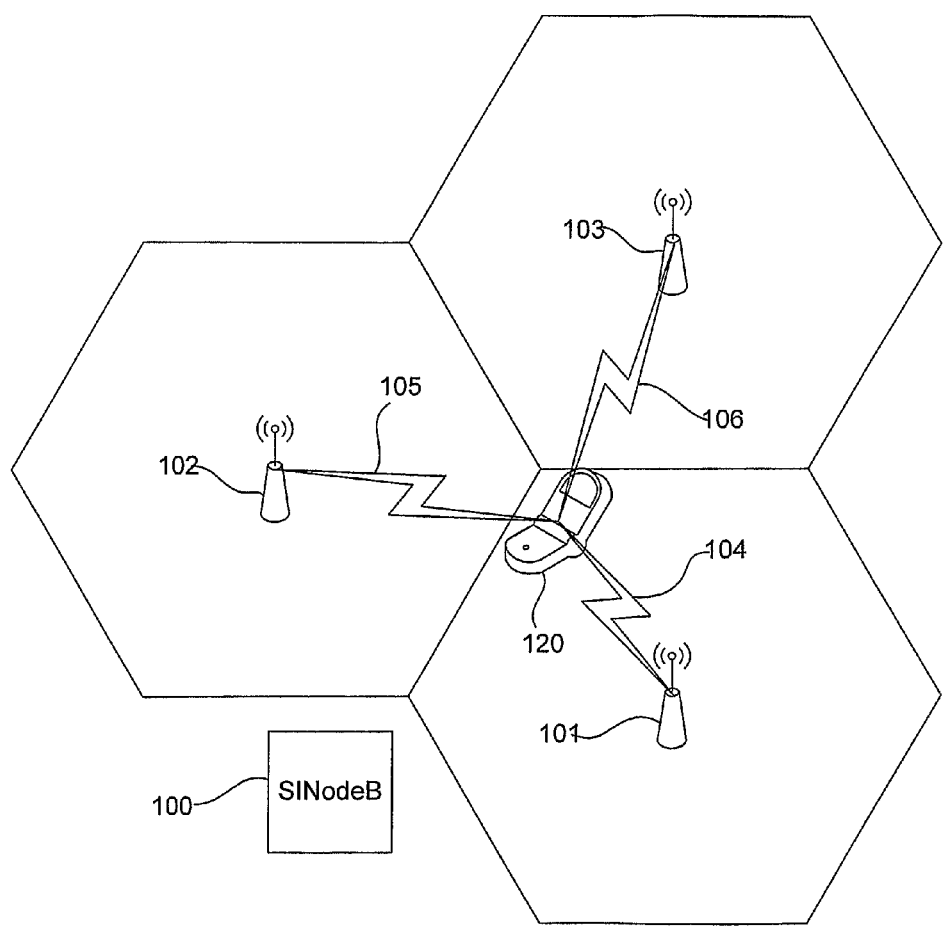
FIG. 3 is a schematic diagram showing a 3G network including a User Equipment device (UE), and a SINodeB.

FIG. 3 shows a 3G network comprising three NodeBs 101-103 broadcasting to three cells by downlink transmissions 104-106 each having a unique downlink scrambling code. On moving into the vicinity of the three NodeBs, a User Equipment device (UE) 120 evaluates on which NodeB to camp.

The UE 120 is required to constantly re-evaluate the signals from cells around it. It does this to ensure that during a connection (data or voice) it is always communicating with the best (most appropriate) NodeB. However a 3G UE will spend most of its time when not transmitting voice or data traffic in an idle state. In this idle state the UE will monitor the strength of the serving NodeB and other neighbour NodeBs, and if the criteria specified by the network are met then it will perform a cell reselection converting one of the previous neighbour NodeBs into the new serving NodeB. If this new serving NodeB is in a different location or routing area then the UE must perform a location or routing area update procedure to inform the network of its new location. This is done so that the network will always have an idea of where the UE is in the network, so that in the event of an incoming call request to the UE the network can use the minimum amount of resources to request the UE to establish a signaling connection.

Each NodeB transmits broadcasted information that serves two main purposes. First, some of this information is transmitted using well know codes and data patterns that allow the UE to recognise that the RF signal being received is actually a UMTS cell and also allows the UE to perform power measurements on the received signal. Second, descriptive information about the cell is broadcast. This system information is transmitted in the form of System Information Blocks (SIBS) which describe many parameters of the NodeB and provide enough information for the UE to identify the mobile network that the NodeB belongs to, and also to establish a signaling connection if it needs to.

Figure 4:
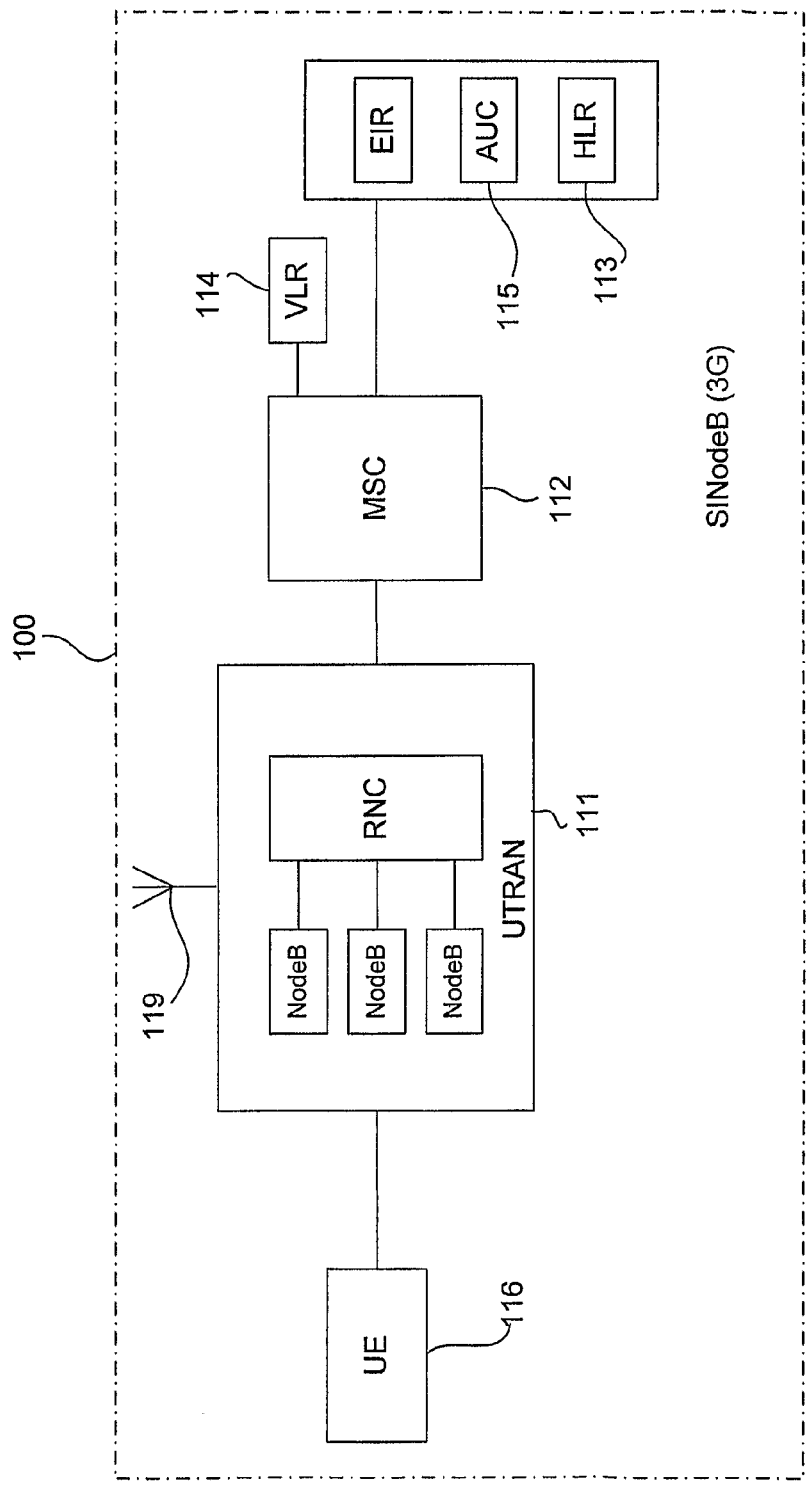
FIG. 4 shows the SINodeB in further detail.

FIG. 4 shows a Separately Introduced NodeB (SINodeB) 100. The SINodeB 100 is configured to acquire an identity parameter from a UE registered with the 3G network of FIG. 3. This is achieved by emulating a NodeB using a method specially adapted to the UMTS protocol, as described in further detail below.

The SINodeB 100 is typically a mobile device, which may be housed in a vehicle. In use, the SINodeB 100 is moved to an area, and operated to acquire identity parameters from a set of User Equipment devices (UEs) registered with the 3G network in that area. Alternatively the SINodeB 100 may be permanently located in an area of interest. In both cases, the SINodeB 100 effectively transmits a false cell broadcast which is not under the control of the 3G network providing coverage to that area.

In order to persuade the UE to move over to the SINodeB 100, certain criteria must be met. Primarily the transmission must be received at the UE with a higher signal strength. Even once the UE has made the decision that the SINodeB 100 is preferential it would normally be considered necessary to pass the UMTS security procedures in order to be able to gather any useful information or perform any useful tasks.

It is not necessary to exactly emulate all the configuration of an existing NodeB for it to be a suitable candidate for a UE to connect to. This makes the task of configuring the SINodeB 100 much simpler. The reason for this is that the broadcasted system information defines the configuration of the cell that is transmitting that data, and cells within the same network will have different configurations, so the UE always looks at the data from the current cell to determine the necessary information.

The key parameters in the false cell broadcast that need to be considered for changing are as follows:
Cell Frequency
Primary Scrambling code
Mobile Country Code (MCC) [—which country this cell is in]
Mobile Network Code (MNC) [—which network this cell belongs to]
Location area code (LAC)
Routing area code (RAC)
Cell power
SIB value tags [—Value tags are use by the UE to detect if SIB information has changed between reads of the SIBs]
Contents of SIB18 and SIB11 for serving cell [—SIB 11 contains measurement control information to be use by the UE in idle mode/SIB 18 contains PLMN ids of neighbour cells to be considered in idle and connected mode]

The MCC and MNC must be the same as the serving cell for the UE to consider the SINodeB to be in the same network.

The Cell Frequency must be the same as the serving cell to make the process as easy as possible—interfrequency reselections have more complex criteria and processes.

There are several options for configuring the other parameters transmitted by the SINodeB:
1) Same LAC/RAC and Primary Scrambling code, different SIB value tags—This completely mimics the serving cell, and allows the SINodeB to actively grab the UE.
2) Different LAC/RAC and Primary Scrambling code—where Scrambling code is present in the SIB11 of the serving cell. This is mimicking a neighbour NodeB that the serving NodeB has been instructing the UE to perform measurements on—thus ensuring that the UE is trying to look for the SINodeB. This causes a UE to perform a cell reselection to the SINodeB if the SINodeB transmission is of sufficiently higher power than the serving NodeB. The amount by which the SINodeB needs to be a stronger signal is defined in SIB3 of the serving NodeB.
3) Different LAC/RAC and Scrambling code—no reference in SIBS of the serving NodeB.

Once a suitably strong and configured cell is being transmitted, the UEs in the target area will perform a cell reselection to the SINodeB and establish an RRC connection for the purpose of performing a location updating procedure. The location update is required because the LAC of the SINodeB is different from the old serving SINodeB. Once the RRC connection is established the SINodeB has the opportunity to perform other signaling procedures as desired.

The UMTS protocol is designed to enhance the security and identity protection features in GSM. To this end, authentication and integrity mechanisms are used in addition to the temporary identities found in GSM. These temporary identities avoid the frequent transmission of the identity of the IMSI and the IMEI, because once the network has assigned the phone a temporary identity then it maintains a mapping from that new identity to the IMSI.

Mechanisms exist to allow the network to interrogate a phone for its IMSI and IMEI and these are used for the first connection of a phone to the network or when an error has occurred and the network needs to re-establish the correct mapping between a temporary identity (such as a TMSI) and its associated real identity (such as an IMSI). In normal network operation almost all signaling between the UE and the network must be performed after the authentication procedure has been completed successfully and integrity has been enabled on the signaling connection. This makes the falsification or modification of signaling by a third party effectively impossible.

Unless a NodeB is provided with a mechanism to successfully pass the authentication and integrity procedures, then the UMTS protocols are designed that almost no useful communication can be achieved with the UE. However there are "gaps" in the UMTS protocols that allow the IMSI, IMEI and TMSI to be retrieved from the UE by the SINodeB 100 without requiring these security mechanisms.

These "gaps" are described in 3GPP TS 33.102 version 3.13.0 Release 1999, and in 3GPP TS 24.008 version 3.19.0 Release 1999. The relevant portions of these protocols will now be described.

3GPP TS 33.102 Version 3.13.0 Release 1999

This protocol specifies in Section 6.5 that all signaling messages except the following shall be integrity protected:
HANDOVER TO UTRAN COMPLETE
PAGING TYPE 1
Pusch Capacity Request
PHYSICAL SHARED CHANNEL ALLOCATION
RRC CONNECTION REQUEST
RRC CONNECTION SETUP
RRC CONNECTION SETUP COMPLETE
RRC CONNECTION REJECT
RRC CONNECTION RELEASE (CCCH only)
SYSTEM INFORMATION (BROADCAST INFORMATION)
SYSTEM INFORMATION CHANGE INDICATION Thus these messages cannot be integrity protected under any circumstances.

3GPP TS 24.008 Version 3.19.0 Release 1999

This protocol specifies a list of messages which the UE can respond to, in certain circumstances, without first having integrity protected the network. Specifically, the protocol states the following:

Except the messages listed below, no layer 3 signalling messages shall be processed by the receiving MM and GMM entities or forwarded to the CM entities, unless the security mode control procedure is activated for that domain.

MM messages:
AUTHENTICATION REQUEST
AUTHENTICATION REJECT
IDENTITY REQUEST
LOCATION UPDATING ACCEPT (at periodic location update with no change of location area or temporary identity)
LOCATION UPDATING REJECT
CM SERVICE ACCEPT, if the following two conditions apply:
no other MM connection is established; and
the CM SERVICE ACCEPT is the response to a CM SERVICE REQUEST with CM SERVICE
TYPE IE set to 'emergency call establishment'
CM SERVICE REJECT
ABORT
GMM messages:
AUTHENTICATION & CIPHERING REQUEST
AUTHENTICATION & CIPHERING REJECT
IDENTITY REQUEST
ATTACH REJECT
ROUTING AREA UPDATE ACCEPT (at periodic routing area update with no change of routing area or temporary identity)
ROUTING AREA UPDATE REJECT
SERVICE REJECT
DETACH ACCEPT (for non power-off)
CC messages:
all CC messages, if the following two conditions apply:
no other MM connection is established; and
the MM entity in the MS has received a CM SERVICE ACCEPT message with no ciphering or
integrity protection applied as response to a CM SERVICE REQUEST message, with CM SERVICE
TYPE set to 'Emergency call establishment' sent to the network.

Therefore an RRC Connection can be set up without requiring integrity protection, since the RRC connection messages are listed as not requiring integrity protection in 3GPP TS 33.102 version 3.13.0 Release 1999. After an RRC Connection has been established between the SINodeB and the UE, for the purpose of a location update procedure a series of MM Identity Requests are sent by the SINodeB 100 to retrieve the UE identification information. Again, the UE responds to these MM Identity Requests without requiring integrity protection because MM Identity Request is specified in the list given above in 3GPP TS 24.008 version 3.19.0 Release 1999.

Specifically, the series of messages between the UE and the SINodeB is as follows:
UE<->SINodeB
→RRC Connection Request
←RRC Connection Setup
→RRC Connection Setup Complete
→MM Location Update Request
←MM Identity Request (Requesting IMSI)
→MM Identity Response (IMSI)<
←MM Identity Request (Requesting IMEI)
→MM Identity Response (IMEI)
←MM Identity Request (Requesting IMEISV)
→MM Identity Response (IMEISV)
←MM Identity Request (Requesting TMSI)
→MM Identity Response (TMSI)

When the UE sends the MM Location Update Request, it also starts an LAC update timer. The SINodeB ignores this request. If the UE does not receive a valid response to the MM Location Update Request within a predetermined time, then the UE resends the MM Location Update Request. This process is repeated a few times and then the UE aborts the connection.

Thus by sending the series of three MMI Identity Requests straight after the RRC Connection is established, and before the UE aborts the connection, the SINodeB can receive the MM Identity Response messages from the UE without requiring integrity protection.

Once the identity information has been collected, the SINodeB rejects the location update request thus preventing the UE from repeatedly trying to camp on to the SINodeB.

The SINodeB is configured to acquire parameters from a plurality of devices in a similar manner to the SIBTS 10 shown in FIG. 2. In this case, instead of obtaining BA lists from GSM BTSs, the SINodeB obtains the list of base stations from SIB11s transmitted by NodeBs in the area. Specifically, each NodeB broadcasts N cells, and each cell includes a SIB11. The union set of cells taken from the various SIB11s is then emulated by the SINodeB. During emulation the parameters transmitted by the SINodeB are set according method 2) above: that is with a different LAC/RAC and Primary Scrambling code associated with a particular cell listed in a SIB11.

FIGS. 1,2 describe a SIBTS 10 which is configured to acquire parameters from an MS registered with a GSM network, and FIGS. 3,4 describe a SINodeB 100 which is configured to acquire parameters from a UE registered with a 3G network. In an alternative embodiment (not shown), a device may be provided which is configured to simultaneously perform the functions of both the SIBTS 10 and the SINodeB 100, optionally sharing some elements of the system (for instance the antenna). This enables a single system to acquire parameters from both 2G and 3G devices in a given area.

The invention claimed is:

1. A method of acquiring the identity parameters of two or more mobile devices, the method comprising:
   a) obtaining a list of two or more base stations; and
   b) acquiring identity parameters from the devices by operating a separately introduced device to emulate each base station in the list,
   wherein two or more base stations are emulated simultaneously by the same said separately introduced device in step b).

2. The method according to claim 1 wherein the list of two or more base stations is obtained in step a) by simultaneously interrogating two or more base stations.

3. The method according to claim 1 wherein the list of base stations is obtained in step
   a) by obtaining a first list of two or more base stations;
   obtaining one or more further lists of one or more base stations from one or more of the base stations in the first list; and
   compiling a union list of base stations, each base station in the union list being contained in at least one of the first and further lists.

4. The method according to claim 1 wherein the list of base stations is obtained in step a) via a wireless link with one or more base stations.

5. The method according to claim 1 wherein the list is obtained in step a) by selecting base stations having a signal strength above a predetermined threshold.

6. The method according to claim 1 wherein the identity parameters are IMSI and/or IMEI and/or TMSI codes.

7. The method according to claim 1 wherein the base stations are emulated by transmitting location area codes on a channel frequency associated with each base station.

8. The method according to claim 1 further comprising sending a reject message to at least one of the mobile devices following acquisition of its identity parameters, to cause the device to return back to its home network.

9. The method according to claim 8 further comprising determining whether the at least one mobile device is a target, and sending the reject message to the device if it is determined not to be a target.

10. The method of obtaining an identity parameter of a target, the method comprising:
acquiring a first set of identity parameters by a method according to claim 1;
acquiring one or more further sets of identity parameters by a method according to claim 1; and
identifying an identity parameter which is common to each of the first and further sets.

11. The method according to claim 1 wherein the mobile devices are registered with a network, and each base station is emulated by broadcasting a false cell which is not under the control of the network.

12. The method according to claim 1 further comprising moving a separately introduced device to an area; and operating the separately introduced device to acquire parameters from mobile devices registered with a network in that area.

13. The method according to claim 1 wherein the mobile devices are registered with a network and configured to respond to a set of integrity protected requests from the network only after the device has authenticated the network, the device also being configured to respond to a non-integrity protected identity request from the network without requiring authentication of the network, and wherein each base station is emulated by transmitting a false cell broadcast which is not under the control of the network, the false cell broadcast including the non-integrity protected identity request.

14. A non-transitory computer readable medium comprising computer program product in one or more computers which, when executed by a processor causes the computer(s) to
a) obtain a list of two or more base stations; and
b) acquire identity parameters from respective computer(s) by operating other respective computer(s) to emulate each base station in the list, wherein two or more base stations are emulated simultaneously by the same said the other respective computer(s) in step b).

15. A method of acquiring the identity parameters of two or more mobile devices, the method comprising:
a) obtaining a list of two or more base stations;
b) acquiring a first set of identity parameters from the devices by emulating each base station in the list;
c) acquiring one or more further sets of identity parameters by repeating steps a) and b); and
d) identifying an identity parameter which is common to each of the first and further sets.

16. A method of acquiring the identity parameters of two or more mobile devices, the method comprising:
a) obtaining a list of two or more base stations;
b) acquiring identity parameters from the devices by emulating each base station in the list; and
sending a reject message to at least one of the mobile devices following acquisition of its identity parameters, to cause the device to return back to its home network.

* * * * *